Feb. 28, 1967  H. EBERHARDT ETAL  3,306,549
DYE JIGGERS
Filed Sept. 20, 1965  11 Sheets-Sheet 5

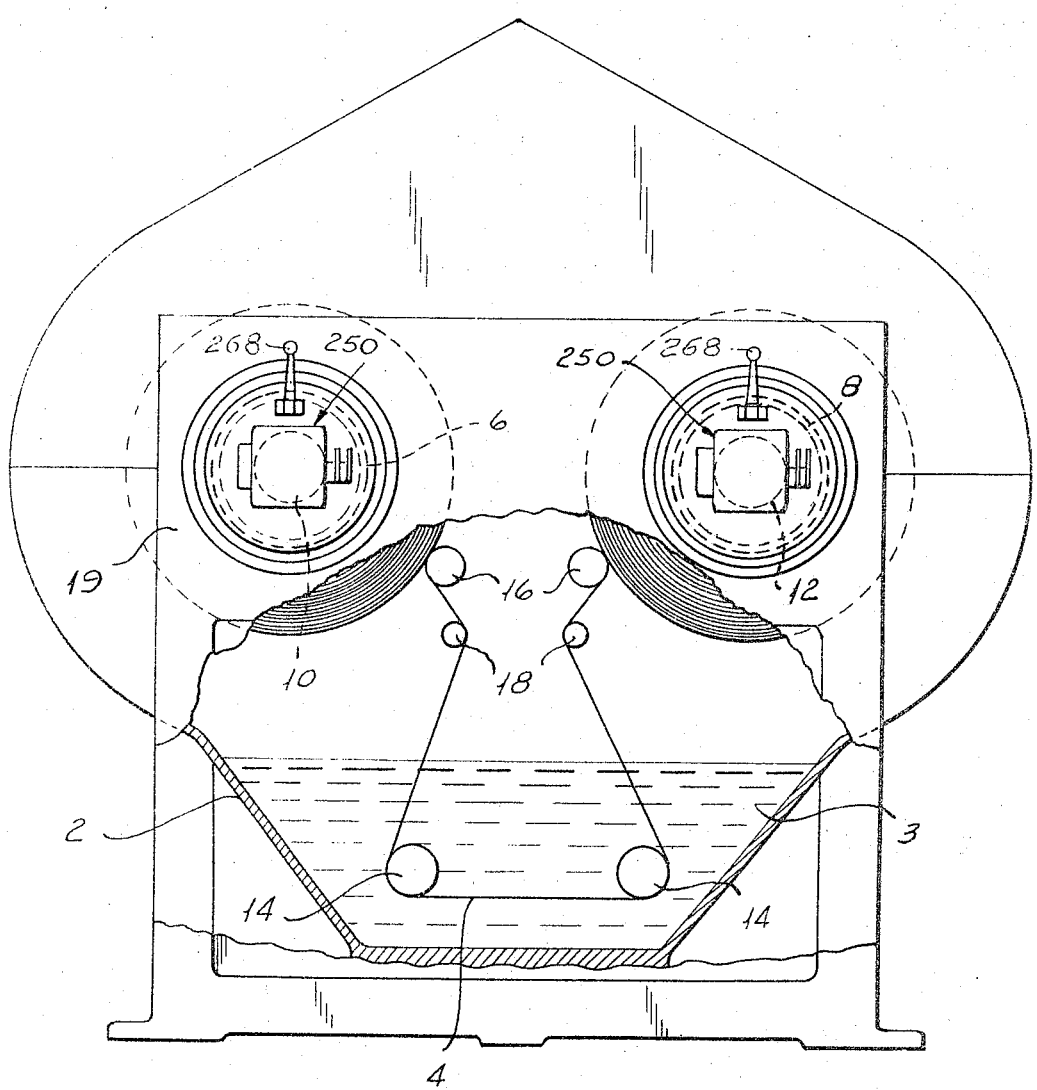

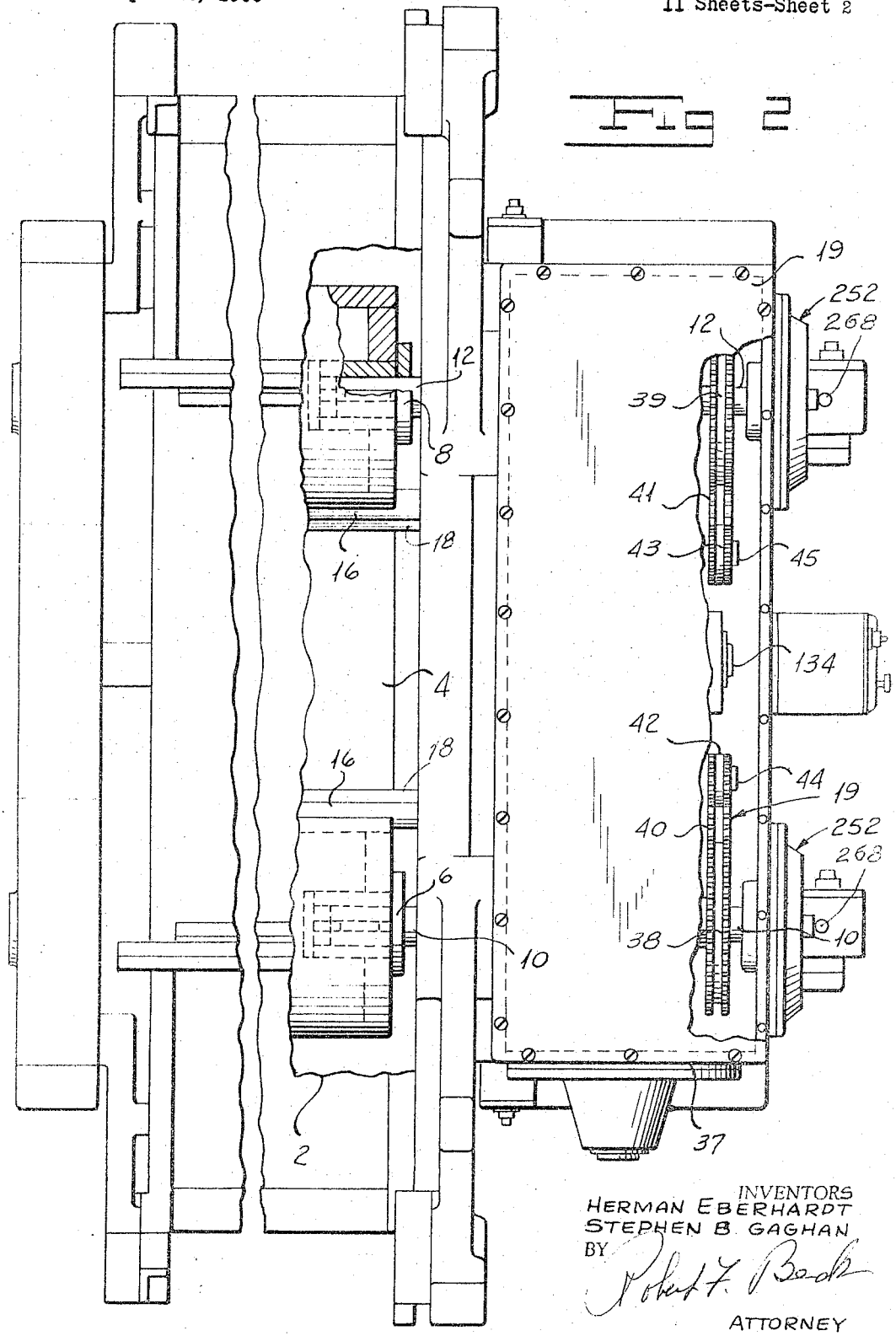

INVENTORS
HERMAN EBERHARDT
STEPHEN B. GAGHAN
BY
Robert F. Beck
ATTORNEY

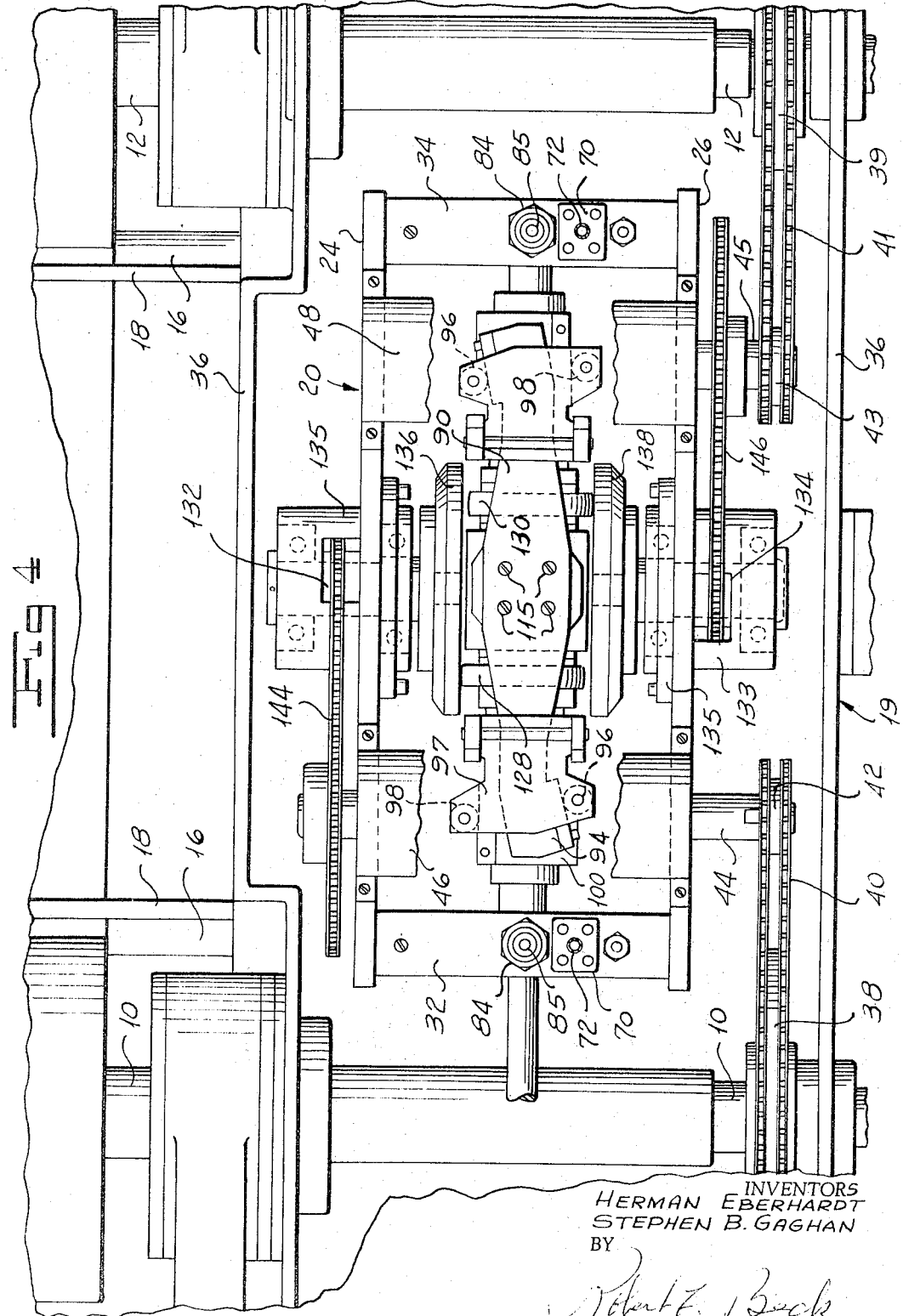

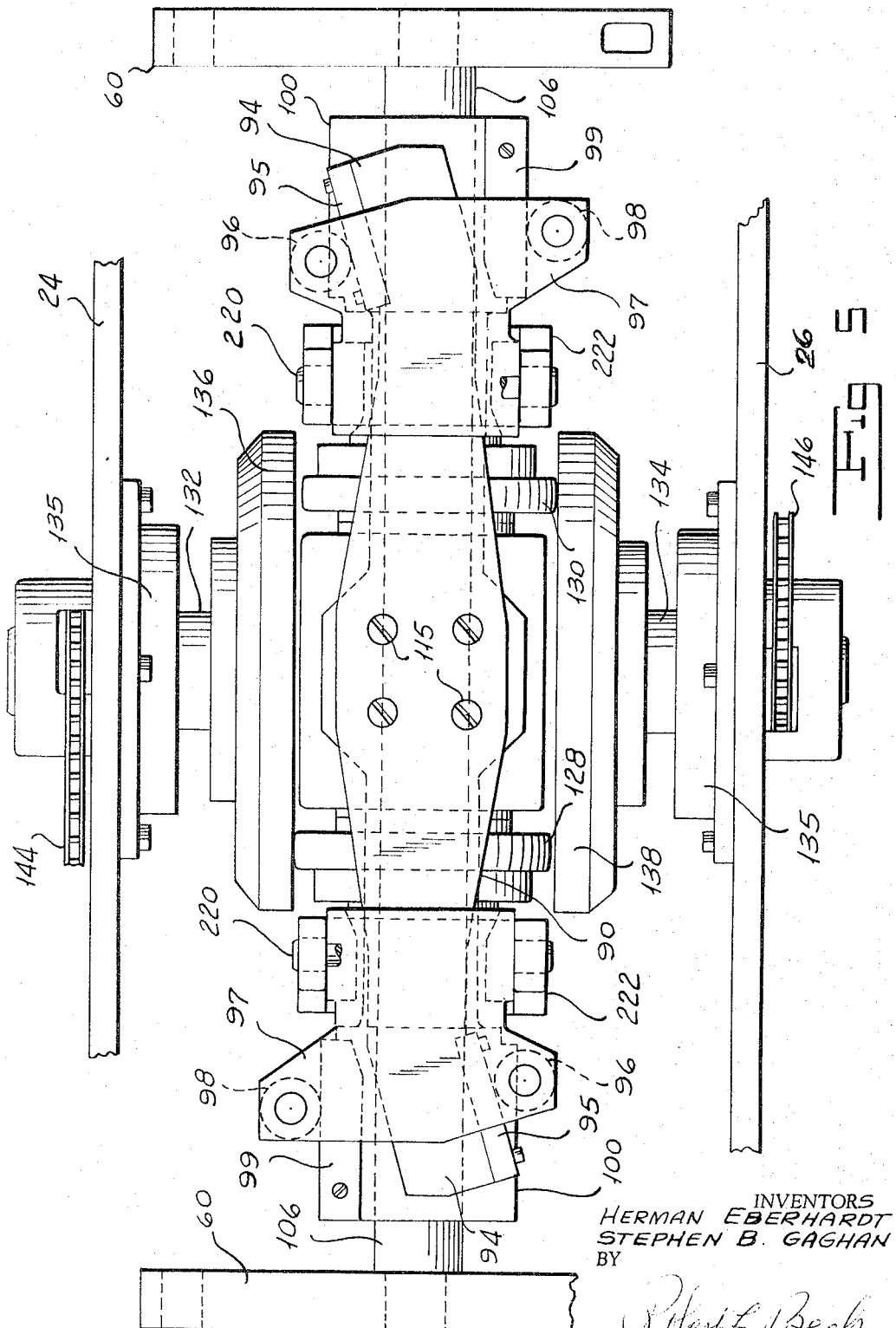

Feb. 28, 1967 H. EBERHARDT ETAL 3,306,549
DYE JIGGERS
Filed Sept. 20, 1965 11 Sheets-Sheet 6

INVENTORS
HERMAN EBERHARDT
STEPHEN B. GAGHAN
BY
Robert F. Beck
ATTORNEY

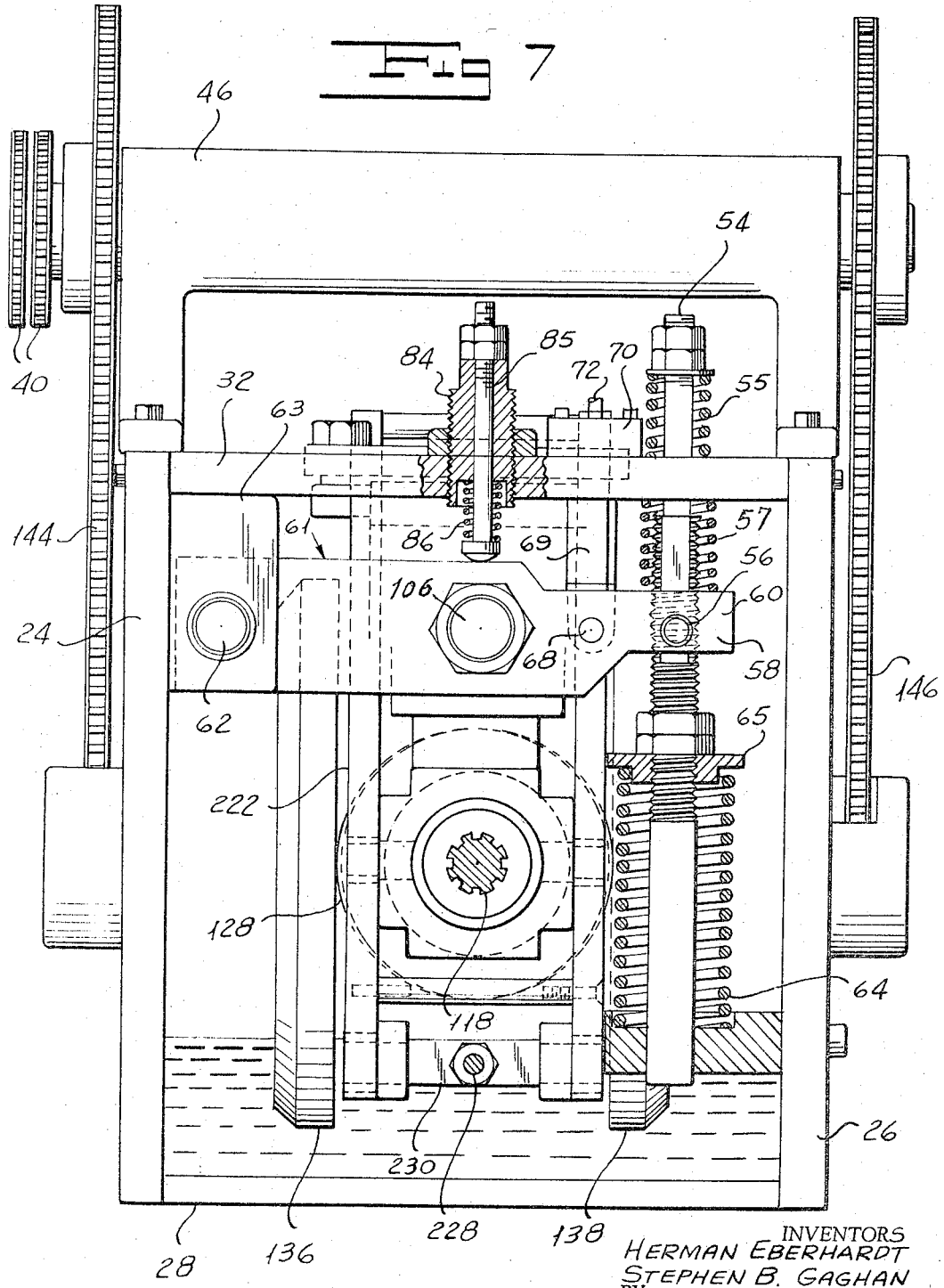

Feb. 28, 1967  H. EBERHARDT ETAL  3,306,549
DYE JIGGERS
Filed Sept. 20, 1965  11 Sheets-Sheet 8
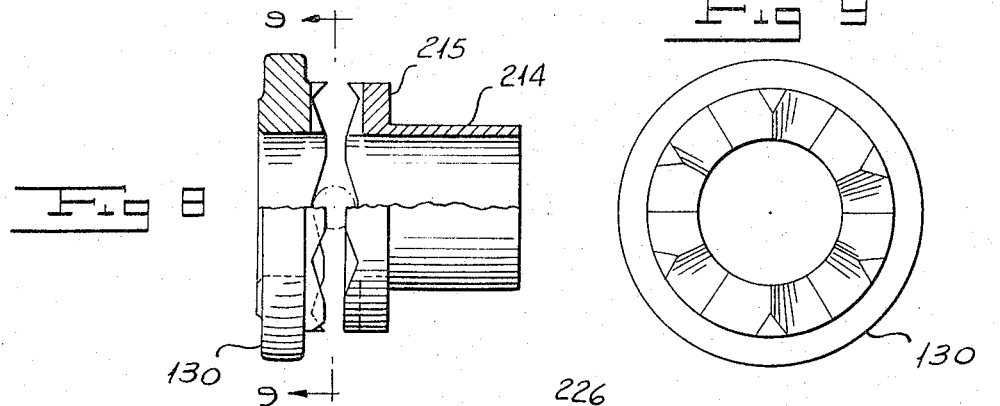
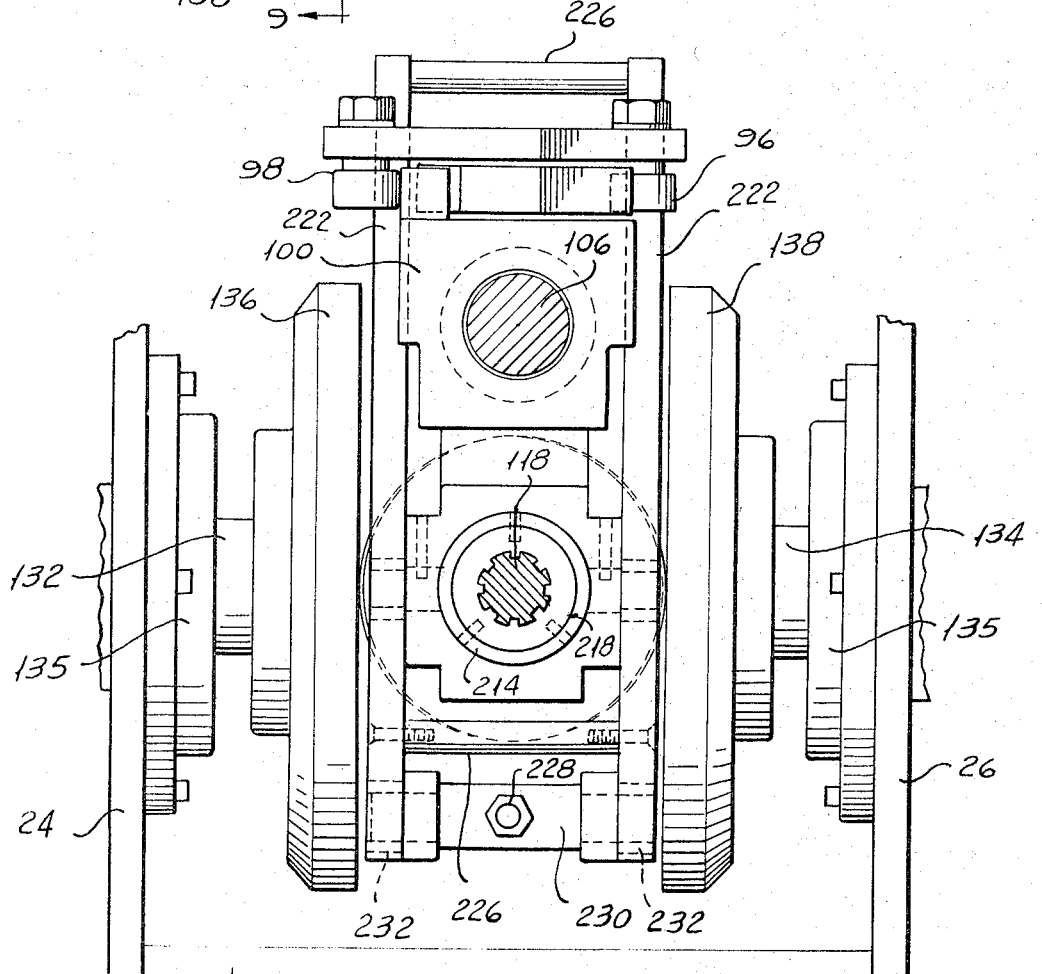
INVENTORS
HERMAN EBERHARDT
STEPHEN B. GAGHAN
BY
Robert F. Beck
ATTORNEY

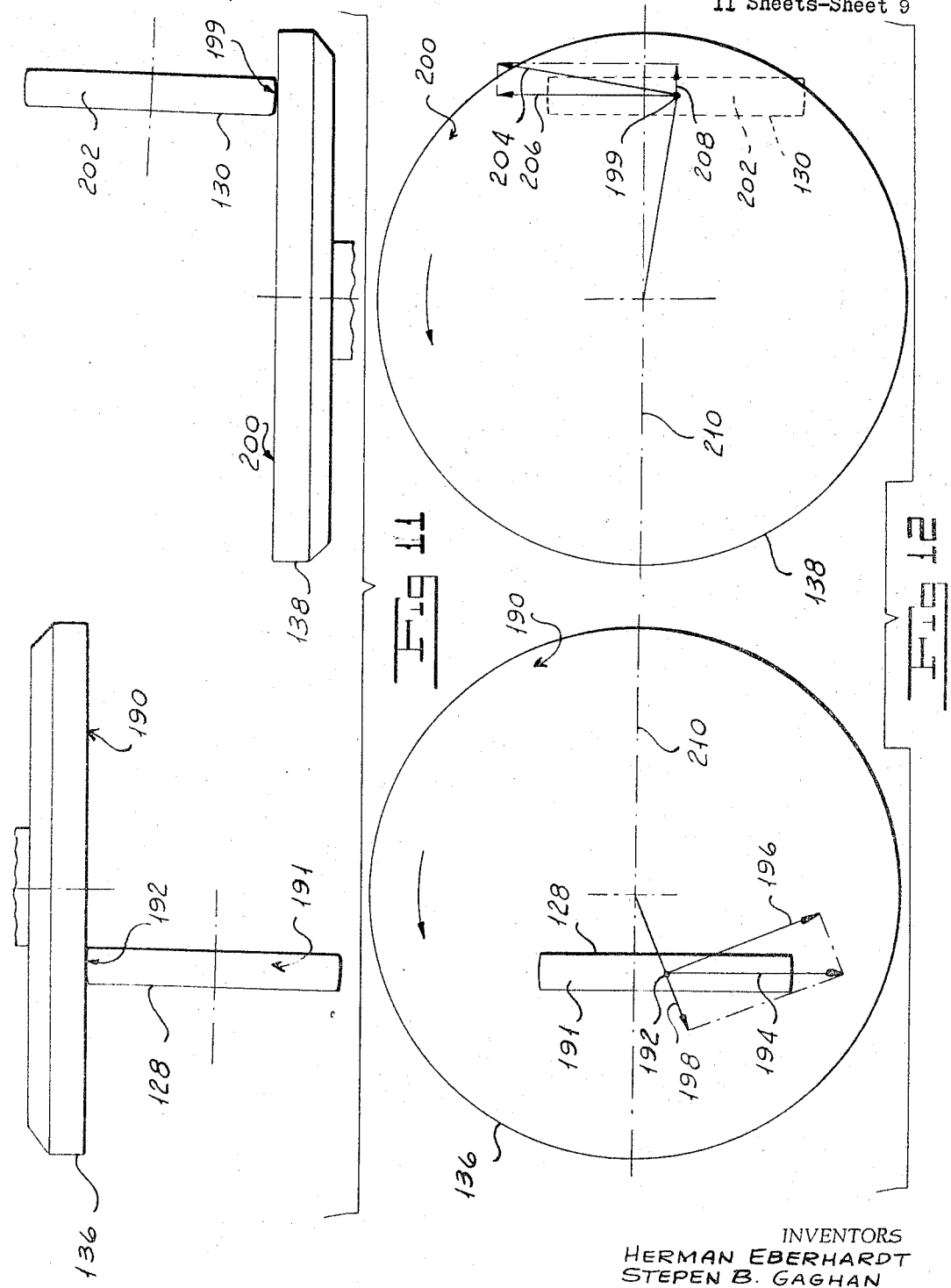

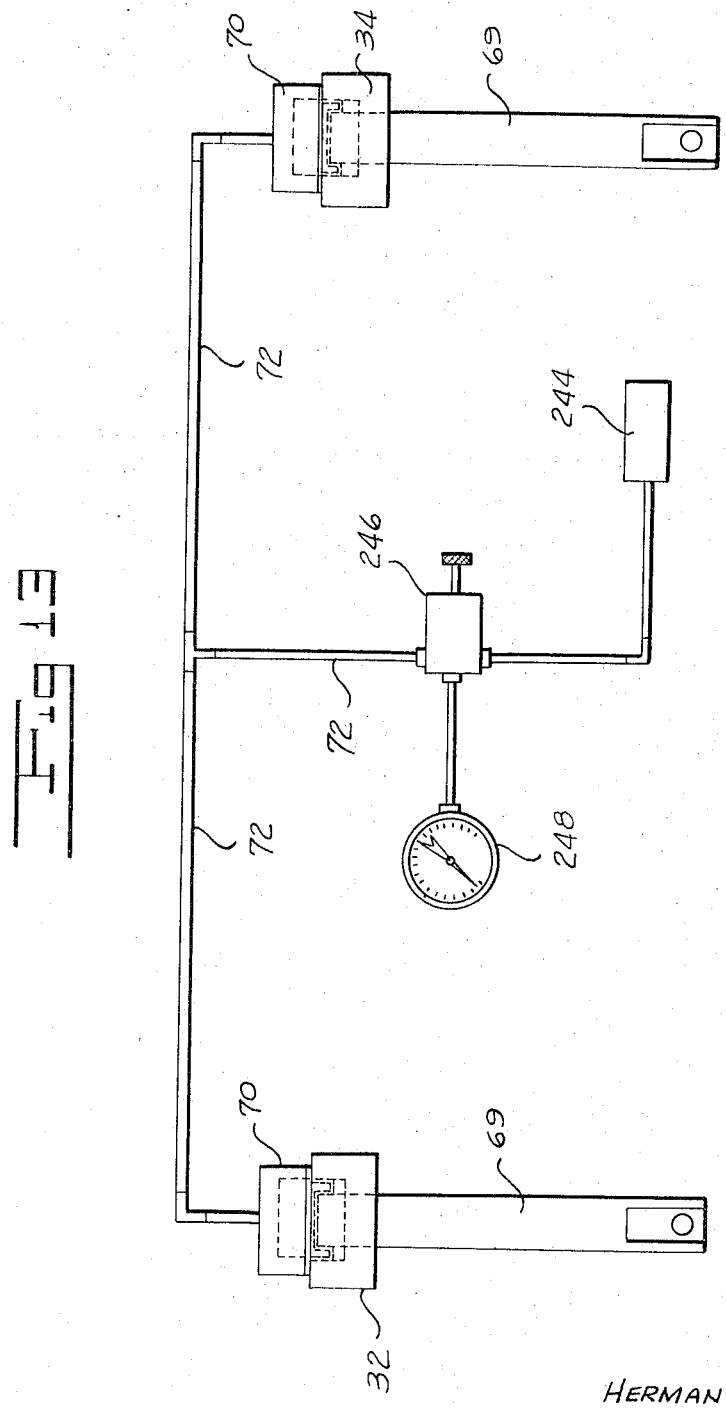

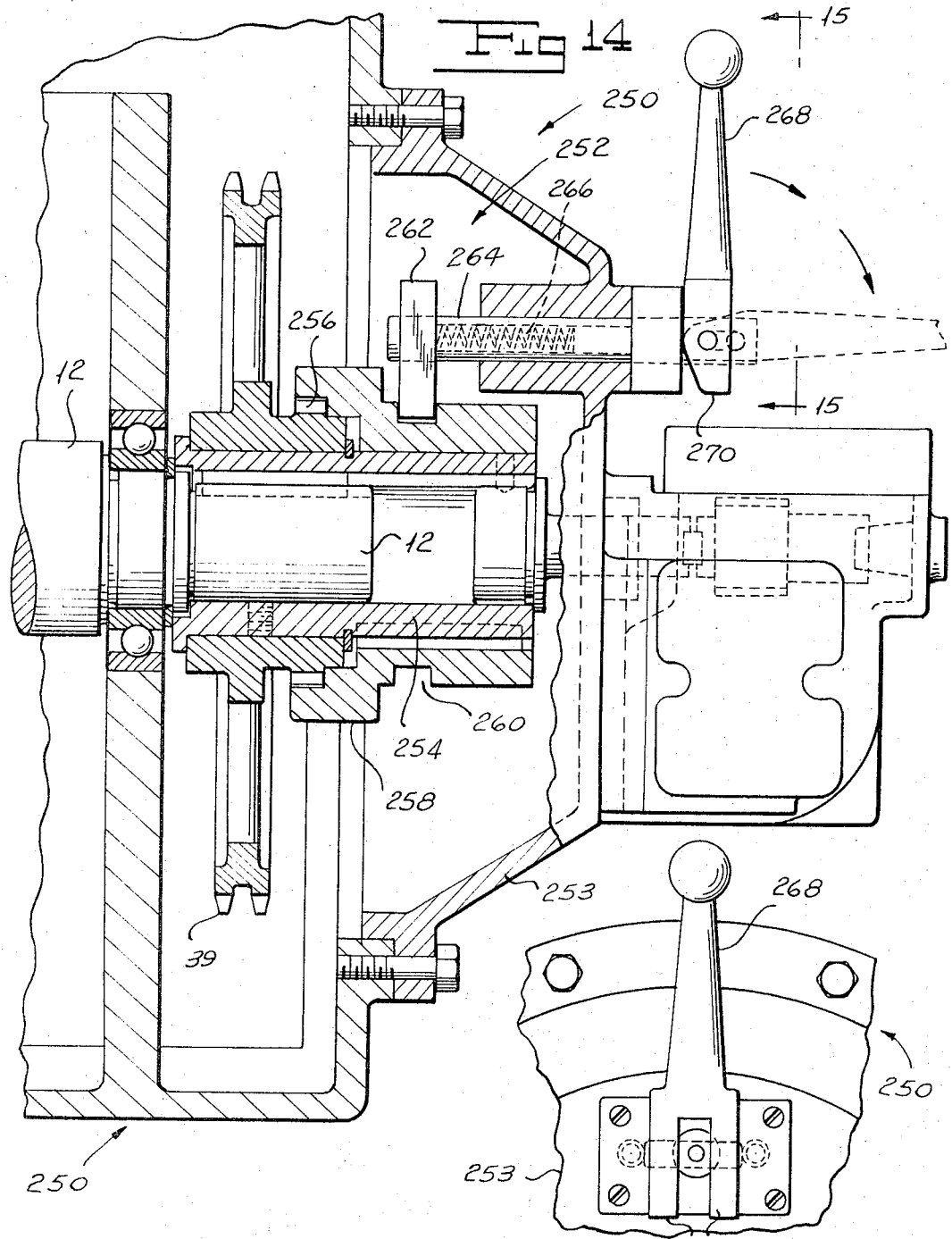

" # United States Patent Office 3,306,549
Patented Feb. 28, 1967

3,306,549
DYE JIGGERS
Herman Eberhardt, Fair Lawn, and Stephen B. Gaghan, Hawthorne, N.J., assignors to Van Vlaanderen Machine Company, a corporation of New Jersey
Filed Sept. 20, 1965, Ser. No. 488,661
24 Claims. (Cl. 242—67.5)

This application is a continuation-in-part of our prior application, Serial No. 389,550, filed August 14, 1964, and now abandoned.

This invention relates to the handling of web materials under controlled tension conditions. It is concerned particularly with dyeing apparatus capable of advancing fabric through a dye bath at a substantially constant speed and under substantially constant regulatable tension. The invention provides ideal solutions to problems that have been encountered in connection with dyeing apparatus of the type known as a "Dye Jigger," and it will be helpful to disclose the principles of the invention as applied to such equipment.

In a dye jigger, the fabric to be dyed is guided through a dye bath as it passes between two winding rolls. The fabric is unwound from one roll and wound onto the other. Then the directions of rotation of the rolls may be reversed to pass the fabric through the dye bath in the opposite direction. This winding and rewinding of the fabric may be repeated as many times as is necessary to give the cloth the desired color. Since the shade attained by any given portion of the fabric is a function of the period of time for which that portion has been subjected to the action of the dye, it is important that the linear speed of the fabric be maintained constant throughout each winding operation. The maintenance of substantially constant fabric tension also is important to preclude material longitudinal stretching of the fabric, particularly in connection with the dyeing of elongatable materials such as the stretch fabrics which have come into such wide use in recent years.

Although the desirability of maintaining substantially constant linear speed and tension has been recognized heretofore, the actual attainment of these objectives in commercially feasible dye jiggers presents serious problems. In this type of apparatus, control over speed and tension is normally exercised by controlling the rates of rotation of the winding and unwinding rolls, but the effective diameters of these rolls change continuously during the operation of the equipment, requiring continuous adjustment of the rotational speeds of the rollers.

In most of the dye jiggers in use at the present time, the drive means for the winding rollers is wholly incapable of making the necessary adjustments in rotational speed. In some of these, the linear speed of the fabric will vary at least fifty percent from one portion to another of each winding cycle. One the other hand, the few installations in use prior to the present invention that have been designed to provide the necessary delicacy of control have proved to be deficient on practical grounds. The dye jigger itself is characterized by simplicity and ease of use, and the drive embodied therein must be consistent with these overall machine characteristics in addition to possessing the sophistication required for effectively maintaining substantial constancy in linear fabric speed and fabric tension.

One of the primary objects of the present invention is to overcome the difficulties that have been experienced heretofore in connection with the use of equipment of this general type, by the provision of practical drive apparatus that not only has a capacity for controlling fabric speed and tension within narrow limits, but also has the characteristics of machine reliability, relative simplicity, and ease of use.

Another object of the present invention is to provide a dye jigger with drive apparatus which will effectively control the rotation of the winding and unwinding rolls thereof during all phases of the dyeing operation, but which will not interfere with the threading-up manipulations required in connection with the use of such jigger.

A further object of the present invention is to provide a constant linear speed, constant tension fabric winding system embodying a self-adjusting traction drive apparatus that compensates itself automatically for wear.

An important object of the present invention is to provide simple means for connecting or disconnecting the drive apparatus from the winding and unwinding rolls in order that the latter may be rotated independently of the drive apparatus to permit winding and unwinding of the rolls as required, for example, during the fabric threading operations necessary to condition the equipment for the dyeing of a new batch of fabric or for removing the fabric from the jigger after treatment.

In accordance with the herein disclosed embodiment of the invention, the rotation of the winding and unwinding rolls of a dye jigger is controlled by drive apparatus having a pair of independently rotatable, coaxially mounted, vertical traction discs between which is disposed a drive roller unit having a pair of longitudinally spaced apart drive rollers formed with spherical roller surfaces and rotatable about a common horizontal axis. The diameters of the drive roller surfaces are less than the distance between the contact faces of the discs, but the drive roller unit is mounted in such a way that the rotational axis thereof may be canted in a horizontal plane to bring the roller surfaces into tractional engagement with the discs. When the drive roller unit is canted in the intended manner, the roller surfaces contact their respective discs on opposite sides of a vertical plane containing the common axis of rotation for the discs.

The mounting for the drive roller unit is such as to permit this unit to move both in a horizontal direction and in a vertical direction. This freedom of movement permits the roller unit to position itself so as to adjust the rotational speeds of the discs, and hence the winding and unwinding rolls, for maintaining substantial constancy in fabric speed and tension. During operation of the apparatus, the vertical movements of the drive roller unit take place over a limited range above and below the horizontal axis of the discs in response to variations in fabric tension. Any vertical movement of the axis of the drive roller unit away from the horizontal plane containing the axis of the discs serves to impose upon the roller surfaces forces tending to move the roller unit horizontally in such a direction as to change the relative rotational speeds of the winding and unwinding rolls and thereby to correct for the tension variation which was responsible for the vertical movement of the drive roller unit.

In order to condition the apparatus for maintaining a desired degree of tension in the fabric being wound, means are provided for applying to the drive roller unit a regulatable vertical force. The direction of the applied force is opposite to the direction of the vertical forces imposed upon the drive roller unit as a result of fabric tension, so that the two types of forces tend to balance out. It is preferred that the applied force be regulatable from the exterior of the machine. Adjustments in the applied force hence provide a convenient mode of adjusting fabric tension.

The self-adjusting characteristics of the drive of this invention stem from forces that are developed during operation of the drive. This presents some problems in connection with the starting up of the equipment, such for example, as during a fabric reversal operation. In order to overcome these difficulties, the invention provides for operation of the drive roller unit at two distinct speed ranges. When the apparatus is started up, the drive roller unit is rotated at a slow speed for a sufficient period of time to enable the roller unit to adjust its position to conform to the existing conditions. After these adjustments have taken place, the speed of rotation of the drive roller unit is increased to the desired functional level to be maintained during the dyeing operation.

One important advantage of the present invention resides in the ease with which the drive apparatus may be uncoupled from the winding and unwinding rolls of the dye jigger, it being understood that the roller surfaces of the drive roller unit are normally maintained in tractional contact with the faces of the discs by means which tend to swing or cant the drive roller unit about a vertical axis located midway between the two discs.

The arrangement under which the drive roller surfaces are brought into contact with the faces of the discs by a swinging movement also provides for automatic wear compensation. After a prolonged period of use, some wear may take place on the contacting faces of the drive roller unit and the discs. However, the apparatus automatically adjusts itself through an increase in the cant or inclination of the axis of the roller unit by suitable means. The spherical contour of the contact surfaces of the rollers of the drive roller unit assures that rolling contact between the discs and the roller surfaces will be maintained over a substantial range of inclination of the axis of the roller unit.

A more complete understanding of the invention will be gained from a consideration of the following detailed description of an embodiment illustrated in the accompanying drawings, in which:

FIG. 1 is a schematic view illustrating certain parts of the dye jigger and depicting the path of the fabric being dyed therein;

FIG. 2 is a plan view of the dye jigger having the invention incorporated therein with certain parts being removed and others broken away in the interest of clarity;

FIG. 3 is a side view of the drive mechanism partly broken away and with the casing being shown in section;

FIG. 4 is a plan view of the drive mechanism disposed within the casing, the cover of the casing being removed;

FIG. 7 is an end elevation, partly in section, of the drive mechanism, taken on the line 7—7 in FIG. 6;

FIG. 8 is a detail partial section of one of the clutch elements;

FIG. 9 is a view at right angles thereto, on the line 9—9 in FIG. 8;

FIG. 10 is a cross section on the line 10—10 in FIG. 6;

FIGS. 11 and 12 are diagrams depicting certain force relationships that give the drive mechanism its capacity for automatic adjustment;

FIG. 13 is a diagrammatic representation of the pneumatic controls for certain of the components of the drive mechanism;

FIG. 14 is a vertical sectional view of one of the clutch mechanisms for connecting and disconnecting a drive to a beam; and FIG. 15 is a fragmentary end elevation of the clutch mechanism disclosed in FIG. 14 and looking in the direction of the arrows 15—15.

Figure 5:
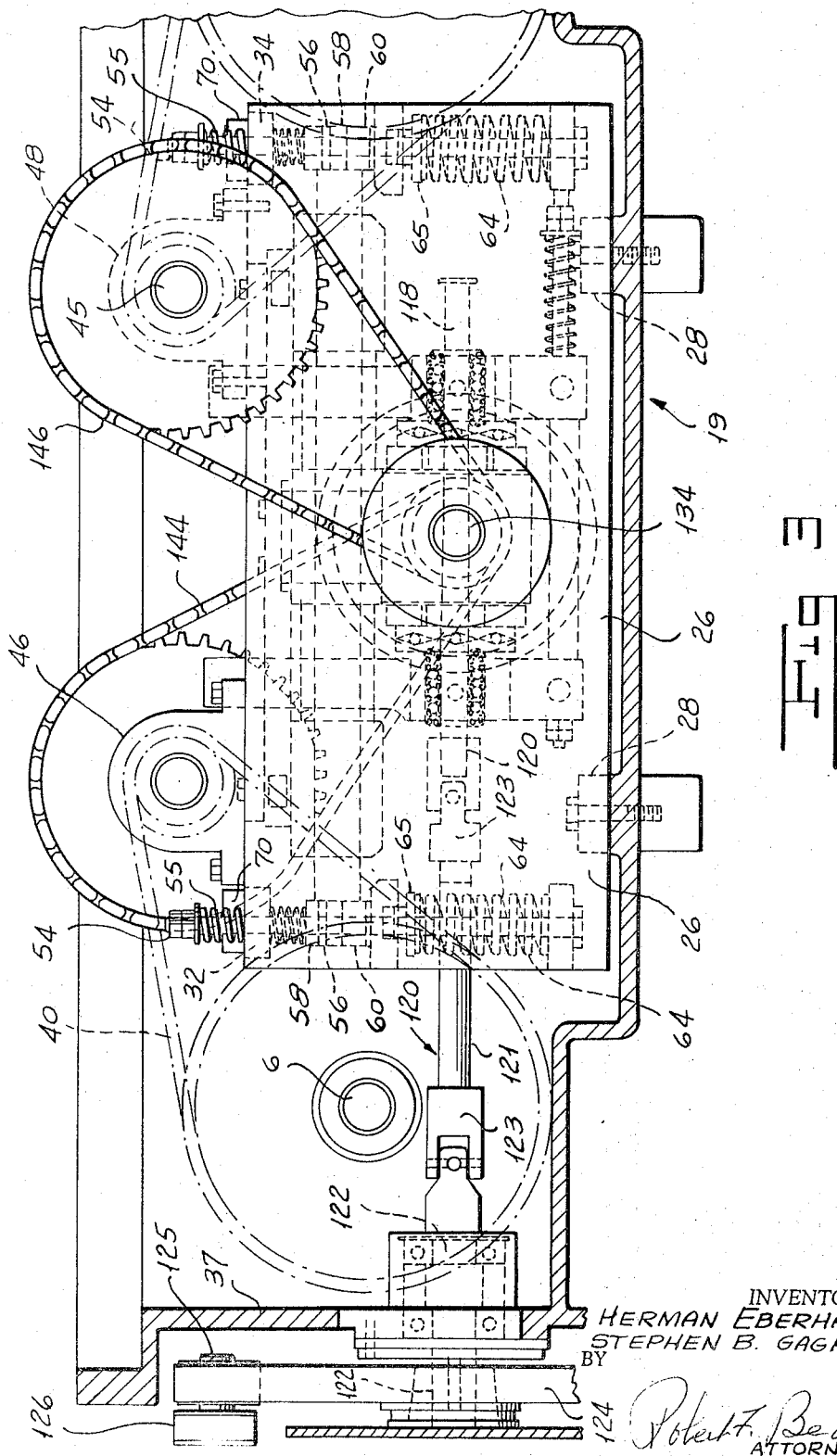
FIG. 5 is a plan view of the carriage.

The dye jigger illustrated in FIGS. 1 and 2 includes a vat 2 for containing a dye liquor or bath 3 through which fabric 4 is passed one or more times in order to give the fabric the desired color and shade. The fabric to be treated in the dye bath 3 extends between a pair of beams 6 and 8 which may constitute winding and unwinding beams, or conversely, keyed or otherwise secured to shafts 10 and 12, respectively, for rotation therewith. Guide means such as lower and upper guide rolls 14 and 16 are provided together with expander bars 18 for guiding the fabric 4 through the dye bath as it passes from one of the beams to the other.

Initially, the fabric is usually contained on a supply or batch-roll which is adapted to be mounted adjacent the vat 2 to permit the leading or outer end of the fabric on the supply or batch-roll to be trained over the closer of the beams, for example, beam 6, then about the guide rolls and bars and secured to the distal beam 8 and have its trailing end attached to the beam 6 for winding the fabric thereon as the latter passes through the dye bath. It is to be understood that when the fabric has been sufficiently treated by the dye bath the trailing end of the fabric from one of the beams is attached to the batch-roll and the latter rotated to wind the fabric thereon for removal from the dye jigger.

The overall arrangement of the parts just described is generally conventional. In utilizing the dye jigger, it is customary to unwind the material or fabric substantially entirely from one of the beams while winding it on the other, and then to reverse the directions of rotation of the beams 6 and 8 to rewind the fabric. Subsequent reversals in direction of rotation can be employed as desired to provide the necessary period of exposure of the fabric 4 to the dye bath 3.

It will be apparent that during any given winding operation, the effective diameter of the fabric wound on the winding beam increases continuously while the effective diameter of the fabric disposed on the unwinding beam decreases continuously. Hence, if a constant linear speed for the fabric is to be maintained, it is necessary to change continuously the rates of rotation of the shafts 10 and 12. It is desirable also that the shafts 10 and 12 be so controlled as to maintain a relatively constant tension in the fabric 4 passing between the winding and unwinding beams.

As shown in the drawings (FIG. 2), the shafts 10 and 12, connected to the beams 6 and 8, extend laterally from the dyeing zone into a casing or housing 19 in which is disposed a drive unit 20 (FIG. 4) provided with a pair of upwardly extending spaced side walls 24 and 26, respectively. The lower ends of the side walls are connected together by spacers 28 which in turn are fixed to the casing 19. The tops of the side walls 24 and 26 have secured thereon the ends of a pair of spaced transversely extending bars 32 and 34 disposed inwardly from the ends of the walls 24 and 26, respectively, as shown in FIGS. 3, 4 and 7.

The transversely extending winding roll shafts 10 and 12 are journaled for rotation within suitable bearings (FIG. 4) carried by the side walls 36 of the casing 19. Adjacent one of the side walls 36, distal from the beams, the shafts 10 and 12 have fixed thereto sprockets 38 and 39 connected by chains 40 and 41 to sprockets 42 and 43, respectively, fixed on drive shafts 44 and 45 journaled for rotation within suitable bearings 46 and 48 (FIG. 3) mounted on the side walls 24 and 26.

The bars 32 and 34 have slidably extending therethrough rods 54 (see FIGS. 3 and 7) having their upper ends provided with lock nuts for confining snubber springs 55 between the nuts and the bars to limit yieldably the downward movement of the rods 54. The rods 54 are pivoted at 56 within the outer or bifurcated ends 58 of a pair of spaced transversely extending levers or arms 60 of a cradle 61. The opposite or inner ends of the arms 60 are pivoted at 62 to bearing brackets 63 carried at the inner face of the wall 24. A spring 57 is interposed between the free end of each lever or arm 60 and the adjacent bar 32 or 34 to cushion the upper swinging movement of the arms 60. Springs 64 are disposed about the lower portions of the rods 54, between caps 65 mounted on the rods and blocks fixed to the wall 26, and function to balance or compensate for the dead weight of the cradle 61. The compression of the springs 64 is adjustable by means of the nuts threaded on the rods and engaging the caps (FIG. 7), the lower ends of the rods being slidable in the blocks.

The arms 60 have pivotally connected thereto at 68 the lower ends of pistons 69 having their upper ends secured to diaphragms mounted in cylinders 70 of pneumatic devices. The cylinders 70 are fixed to the bars 32 and 34, respectively, and have extending therefrom conduits 72 for supplying the devices with air for operating the latter in a manner to control the movements of the arms 60 (see FIG. 13).

Intermediate their ends (FIG. 7), the bars 32 and 34 have threaded therein adjustable bushings 84 which are fixed in adjusted positions in the bars by lock nuts. The bushings 84 have sleeved therein follower pins 85 urged downward by coiled springs 86 bearing thereon in a manner whereby the lower ends of the pins 85 will engage the arms 60 to limit the upward movement thereof to a pre-established position for a reason hereinafter made apparent. This assembly, in effect, forms a snubber for each arm 60.

The cradle 61 is equipped with a carriage 88 (FIG. 6) disposed between the arms 60. This carriage 88 includes a pressure lever 90 extending lengthwise of the housing 19 and is formed on its undersurface with a keyway 92. The lever 90 has opposite end portions 94 extending at obtuse angles to the length of the lever 90.

Each of the end portions 94 has a bearing block or runner 95 secured along one edge thereof, which runners are on opposite sides of the lever 90, each in position for bearing relation against a roller 96 upon axial movement of the lever. Each roller 96 is carried by an anchor plate 97 which has a corresponding roller 98 in position for bearing engagement with a bar 99 extending lengthwise of the lever 90 but normally spaced therefrom.

Each bar 99 is carried by a block 100 which is joined to a shiftable riding block or member 102 disposed under and coextending with the lever 90. The shiftable riding block 102 has a longitudinally extending bore 104 therethrough receiving a guide member or shaft 106 of a smaller diameter and having its ends mounted in the arms 60. The member 102 also has a vertical bore 108 intersecting the bore 104 and disposed midway between the arms 60. The bore 104 slidably mounts the shaft 106 therein for relative movement between the member 102 and the shaft 106. Bosses on the member 102 at the top and bottom thereof surround the bore 108, and one of these bosses bears against the underside of the lever 90 for oscillating movement relative thereto. The carriage 88 is provided with an elongated rotary bearing block 112 disposed in engagement with the lower bearing boss of the member 102 and telescoped in a journaled relation therein, for axial movement relative to the member 102 and for bodily movement longitudinally with the latter.

The block 112 is provided with a shank 113 extending upwardly therefrom within the bore 108. This shank 113 is provided with a key 114 in the slot 92 of the lever 90 for effecting movement of the block 112 with the lever 90 axially relative to the member or shaft 106. This shank 113 is secured to the lever 90 by bolts or screws 115. The shank 113 has a vertical bore therethrough intersecting a cross bore aligned with the bore 104 of the member 102 and through which the shaft 106 extends, the opening forming the vertical bore in the shank 113 being of greater diameter than the shaft 106 to permit of limited rotation of the shank within the bore 108 and thus to enable the the block 112 to rotate axially relative to the member 102.

The block 112 is formed with a longitudinally extending bore in which is rotatably mounted on bearings 116 the grooved inner end section 118 of a drive shaft 120, (see FIG. 3) the section 118 constituting a component of ball-bearing spline assemblies. The outer end section 122 of the shaft 120 is journaled in suitable bearings carried by an end wall 37 of the casing 19 and connected to the section 118 by an intermediate section 121. The end sections 118 and 122 are connected to the section 121 by universal joints 123 which may permit relative lengthwise displacement. The outer end drive shaft section 122 is provided with a pulley 124 connected with a driving shaft pulley 125 of a power motor and which drive may include an overload clutch between the motor and the pulley 125, as indicated at 126 in FIG. 3.

As hereinafter more fully described, the drive shaft section 118 has connected thereto, a pair of drive rollers 128 and 130 (FIG. 6) for rotation by the section 118 and for axial movement relative thereto. The rollers 128 and 130 are mounted individually on roller bearings with a minimum mass for equal and minimum inertia effects. These rollers 128 and 130 are free of the shaft 118 and not fixed thereto. The rollers 128 and 130 are disposed adjacent opposite ends of the block 112 on opposite sides of the latter. Each of the rollers 128 and 130 is provided with a peripheral surface coinciding in shape with that of a segment of a sphere.

As shown in FIGS. 4, 5 and 10, a pair of axially aligned driven shafts 132 and 134 are journaled in suitable bearings 135 secured to and carried by the walls 24 and 26. The inner ends of the shafts 132 and 134 terminate in spaced relation from the block 112 and have fixed on the respective shafts a pair of spaced axially aligned confronting traction discs 136 and 138. The spacing between the inner faces of the discs 136 and 138 is somewhat more than the diameter of the rollers 128 and 130 so that the rollers may be canted into engagement with the discs.

The outer ends of the shafts 132 and 134 are connected by sprocket chains 144 and 146 with respective shafts 44 and 45 for driving, in turn, the shafts 10 and 12 and the beams 6 and 8 supported on and driven by the shafts 10 and 12, respectively.

At this time, it may be well to refer to the plan and elevational diagrams designated as FIGS. 11 and 12 in order to facilitate an understanding of the mode of operation of the drive unit as heretofore described. In these views, the reference character 190 has been applied to designate the contact surface of a traction disc, for example disc 136, coupled to the dye jigger beam 6 onto which the fabric is being wound. The reference character 191 designates the roller surface of the drive roller 128 which is disposed in tractional engagement with the disc contact face 190. The point of contact between the drive roller surface 191 and the driven disc surface 190 is designated by the numeral 192.

It will be observed that the contact point 192 is shown in FIG. 12 to be located below the axis of the rotation of the disc surface 190. The application of downwardly directed forces to the drive roller unit by the pneumatic devices 70 would tend to result in such a positional relationship.

As the roller surface 191 rotates about its horizontal axis, it applies to the disc surface 190 a downwardly directed vertical force represented by the arrow 194 in FIG. 12. However, the disc surface 190 is constrained against movement in the direction of the arrow 194 and only that component of the driving force which is at right angles to a line connecting the contact point 192 with the axis of rotation of the disc surface 190 can be translated into rotational movement of the disc. This force component is designated 196 in FIG. 12. There remains a force component 198 which cannot be translated into rotational movement of the disc surface 190. Although the disc 136 itself is constrained against bodily movement, there is a reaction force opposite in direction to the arrow 198 which tends to move the drive roller unit toward the axis of rotation of the disc surface 190.

It will be observed further that any movement of the contact point 192 to the right in FIG. 12 would shorten the radius represented by the distance between the axis of rotation of the disc surface 190 and the contact point 192. Hence, assuming that the rotational speed of the roller surface 191 is maintained constant, the rotational speed of the disc surface 190, and the beam 6 onto which the fabric is being wound, will increase.

At the same time, somewhat similar phenomena would be operable at the contact point 199 between the disc surface 200 of the disc 138 connected to the unwinding beam 8 and the other roller surface 202 of the roller 130. The tension in the fabric being processed applies a rotational pull to the unwinding beam 8 and thence to the disc 138 in a direction tending to cause the disc surface 200 to overrun the drive.

Rotation of the disc surface 200 in the direction of the arrow in FIG. 12 applies to the roller surface 202 at the point 199 an upwardly directed force extending at right angle to the radius connecting the axis of rotation of the disc surface 200 with the contact point 199. This applied force is designated by the reference numeral 204 in FIG. 12 and it may be resolved into vertical and horizontal components 206 and 208. The horizontal component 208 complements the reaction force tending to move the other roller surface 191 to the right in FIG. 12. Movement of the roller surface 202 to the right increases the distance between the axis of rotation of the disc surface 200 and the contact point 199 to decrease the rotational speed of the disc 138 and the unwinding beam connected thereto.

In addition to the force components tending to move the drive roller unit horizontally, there are force components tending to move the drive roller unit vertically. When the axis of the drive roller unit is below the level of the axis of the discs, as indicated in FIG. 12, these force components are directed upwardly and their magnitudes are proportional to the fabric tension.

As the speed of the winding beam increases and the speed of the unwinding beam decreases, fabric tension increases and the magnitude of the upwardly directed force components applied to the drive roller unit at the contact points 192 and 199 become sufficient to overcome the downwardly directed forces applied by the pneumatic devices 70. Hence, the entire drive roller unit moves bodily upwardly.

In actual practice, this movement will continue beyond the horizontal level 210 of the axis of the rotation of the traction discs 136 and 138, and the force components effective in FIG. 12 to move the drive roller unit to the right will be reversed as the contact points 192 and 199 move above the horizontal level 210 of the axis of rotation of the discs 136 and 138, forces are applied to the drive roller unit at the contact points tending to move the drive roller unit to the left and downwardly as viewed in FIG. 12.

Figure 6:
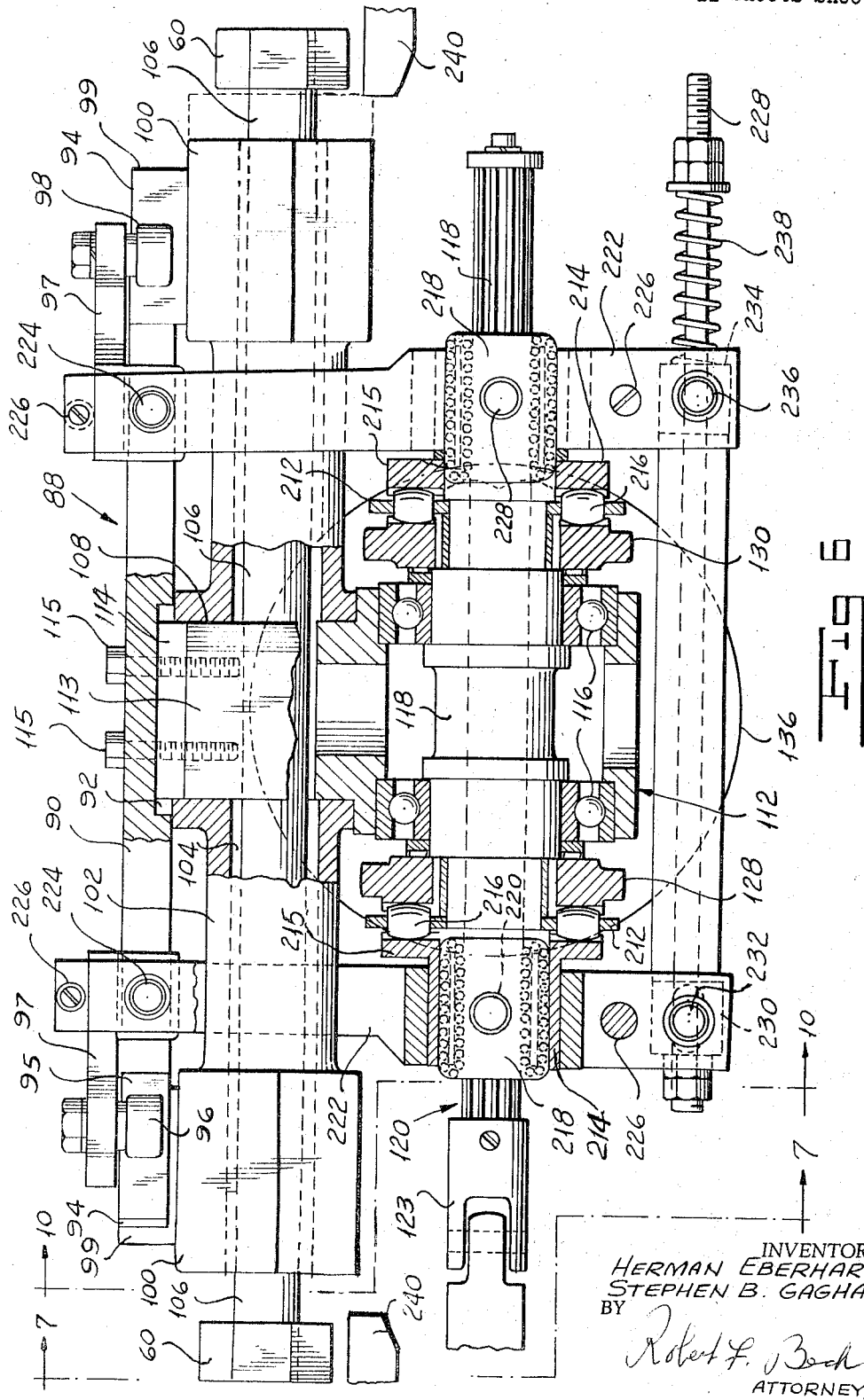
FIG. 6 is a partial vertical section through the carriage.

Instead of directly connecting the rollers 128 and 130 with the drive shaft 120, a clutch connection in each instance is employed therebetween as illustrated in FIGS. 6, 8 and 9. Each connection comprises a clutch-roller retainer 212 interposed between each of the rollers 128 and 130 and the radial face of a bushing 214 having a flange 215. Clutch-rollers 216 are carried by the retainer 212 and are disposed between cam surfaces in the confronting radial faces of the bushings 214 and in the rollers 128 and 130.

The flanges 215 of the bushings surround and are fixed to ball-bearing splines 218 in which the section 118 of the shaft 120 is mounted for axial movement, the ball-bearing spline assemblies serving to reduce friction to a minimum. The flanges 215 are provided with trunnions 220 pivoted in opposite sides of pairs of upright links or levers 222 in which the assemblies are mounted. The pairs of links 222 are capable of swinging toward and from each other about pivots 224 on opposite ends of the lever 90 (see FIG. 6). Each pair of links 222 is formed of spaced members, as shown in FIG. 10, connected together by tie members 226. It is to be understood that, with the drive rollers 128 and 130 stationary, rotation of the shaft 120 will cause axial shifting of the bushings 214 away from the drive rollers 128 and 130, due to the action of the clutch-rollers 216 between the confronting clutch faces, and thereby effect rotation of the rollers 128 and 130.

The links 222 of each pair are connected together by tie members 226 at the upper and lower ends thereof (FIG. 10), while both pairs are connected together at their lower ends by a tie rod 228 (FIG. 6). The tie rod 228 extends through a tie block 230 having a slotted pivotal connection, as at 232, with a pair of levers 222 and through a block 234 having a pivotal connection, as at 236, with the other pair of levers 222. A coiled spring 238 is telescoped over the rod 228 at one end thereof which may be adjusted by nuts on the rod to set a predetermined load on the spring. This forms a pre-loaded spring pressure across the bottom of the floating linkage whereby the pairs of links are capable of movement relative to each other. This pre-loaded spring acts in cooperation with the clutch cams on the faces of the rollers 128 and 130 in opposition to the bushings 214 for contact force directly as a function of the tangential force above the pre-load thus applied to the assembly.

Spring snubbers are provided which precess over travel bumpers of heavy springs allowing excess precess movement only under abnormal loading. However, limit stops, as indicated at 240 in FIG. 6, may be used to limit the outward travel in either direction or in rotation of the carriage by precess movement.

The spring 238 is set for normal pre-load condition. This spring tension tends to swing the lower ends of the links 222 inwardly toward each other, thereby imparting inward movement on the trunnion blocks 218 when normal drive is then imparted by the drive shaft 120 to the rollers 128 and 130 through the roller clutches 212–216. When an overload condition is encountered, the slotted connection at 232 will allow the lower ends of the pairs of links 222 to be spread apart, whereby the clutch rollers 216 function between their cam faces to axially move the bushings 214 away from the rollers 128 and 130, thereby causing the pairs of links 222 to pivot about their pivots 224 and thus spread the lower ends of the pairs of links apart against the tension of the spring 238. This in turn moves the top rollers 96 which will allow twisting of the carriage and thereby increase pressure to increase the driving force on the shafts 10 and 12. When the overload condition is relieved, the parts resume their normal relations.

The pneumatic circuit for supplying fluid to the cylinders 70 is illustrated in FIG. 13. These cylinders are connected in parallel through lines 72 from a source of fluid supply, generally designated at 244. A manually adjustable pressure regulator is indicated at 246 for controlling the air or other fluid supplied to the lines. A pressure gauge 248 may be used therewith if desired.

The amplitudes of the vertical movements of the drive roller unit are, of course, quite small in actual practice, so that substantially constant fabric tension is maintained throughout each winding cycle. The lock nuts on the upper ends of the rods 54 and the pins 85 may be adjusted as desired to fix the upper and lower limits of possible vertical movement of the drive roller unit to assure against excursions of great magnitude while the springs 55 and 64 function to prevent excessive oscillations.

Moreover, the controlled changes in the rotational speeds of the beams which result in constant fabric tension also serve to maintain substantially constant linear fabric speed. Even when large diameter beams of cloth are being processed, the system is adequate to prevent linear speed variations in excess of about plus or minus six percent.

The pressure regulator 246 is actuable from the exterior of the casing 19 so that the devices 70 may be controlled without requiring access to the mechanical components of the drive. The operator can set the pressure regulator to whatever value is required for the maintenance of a level of fabric tension suitable for the particular material being handled.

The operator can also uncouple the drive mechanism quickly and easily from the beams by clutch means hereinafter described. This capacity to uncouple the drive means is an especially advantageous feature in connection with the treading-up operations carried out during the loading of the dye jigger with a new batch of fabric to be dyed or during the unloading of the jigger. In the threading-up operations, it is usually desirable to rotate the beams a few turns by hand and the force required to move the entire drive by hand would be unreasonably large.

The clutch means 250 comprises clutch devices 252 carried by the outer wall 36 and disposed at the ends of the shafts 10 and 12 respectively. An example of one of such devices is disclosed in detail in FIGS. 14 and 15 in connection with the shaft 12. Each device 252 comprises a housing 253 in which is enclosed a sleeve 254 keyed to the drive shaft 12 for rotating the latter and having rotatably mounted thereon sprocket 39, for driving the shaft 12. A hub of the sprocket 39 is provided with clutch teeth 256 which normally mesh with similar teeth provided on a coacting clutch sleeve 258, the latter being slidably keyed on the sleeve 254 for rotating the latter and for axial movement relative thereto for the purpose of effecting engagement and disengagement of the teeth 256. The sleeve 258 is provided with a circumferential slot 260 in which is disposed a clutch operating finger or member 262 fixed to the end of a rod 264 in which is contained a spring 266 for urging the rod and finger 262 in the direction toward the sprocket 39 and the teeth 256 of the sleeve into engagement with the teeth of the hub of the sprocket. The outer end of the rod 264 has pivoted thereto a handle 268 having a lower end 270 depending therefrom and of a greater width than the distance between the pivot of the handle and the housing, whereby upon pivoting of the handle downwardly, as illustrated in dotted lines in FIG. 14, the finger 262 will be moved outwardly and thus effect disengagement of the clutch teeth 256. The lower end of the handle 270 is provided with a flat surface for engaging the housing, whereby to maintain it in down position during disengagement of the teeth, thus permitting the aforementioned manual loading or unloading of the jigger. Upon raising of the handle by the operator to the full line position, shown in FIG. 14, the spring 256 functions to urge the sleeve 258 toward the pulley and the teeth 256 into meshed relation.

Although an embodiment of the invention has been illustrated and described in detail, persons of ordinary skill in the art will recognize that variations and modifications may be made without departing from the principles of the invention. It is intended therefore that the foregoing description be considered as exemplary only and that the scope of the invention be ascertained from the following claims.

We claim:

1. Apparatus for linearly elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, and means for urging said roller unit about said axis of swinging movement to press said first roller surface against one of said disc faces and said second roller surface against the other of said disc faces.

2. Apparatus for linearly advancing elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, means for urging said roller unit about said axis of swinging movement to press said first roller surface against one of said disc faces and said second roller surfaces against the other of said disc faces, and drive means operatively connected with the roller unit for rotating the roller surfaces in operative relation to the discs and thereby advancing the material through the zone.

3. Apparatus for linearly advancing elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, means for urging said roller unit about said axis of swinging movement to press said first roller surface against one of said disc faces and said second roller surface against the other of said disc faces, drive means for the roller unit, and means forming a clutch connection from the drive means to the roller surfaces which varies in driving effect with conditions of load.

4. Apparatus for linearly advancing elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, means for urging said roller unit about said axis of swinging movement to press said first roller surface against one of said disc faces and said second roller surface against the other of said disc faces, drive means for the roller unit, and overload release means for reducing the driving effect thereof on the roller surfaces in proportion to the load condition of the material.

5. Apparatus for linearly advancing elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, means for urging said roller unit about said axis of swinging movement to press said first roller surface against one of said disc faces and said second roller surface against the other of said disc faces, drive means for the roller unit, and overload release means for reducing the action of the roller surfaces on the discs under abnormal driving conditions.

6. Apparatus for linearly advancing elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, means for urging said roller unit about said axis of swinging movement to press said first roller surface against one of said disc faces and said second roller surface against the other of said disc faces, drive means for the roller unit, overload release means for reducing the action of the roller surfaces on the discs under abnormal driving conditions, said release means comprising link assemblies mounted for relative movement, means operatively connected with the link assemblies for controlling the connection of the drive means with the roller surfaces, and means yieldably holding the link assemblies in preset relation to each other.

7. Apparatus for linearly advancing elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, means for urging said roller unit about said axis of swinging movement to press said first roller surface against one of said disc faces and said second roller surface against the other of said disc faces, drive means for the roller unit, overload release means for reducing the action of the roller surfaces on the discs under abnormal driving conditions, said release means comprising a pair of link assemblies, means mounting the link assemblies for pivotal movement toward and from each other, clutch means operatively connecting the drive means with the roller surfaces, means operative by the link assemblies for varying the clutch engagement of said clutch means, and means yieldably holding the link assemblies in preset relation to each other.

8. Apparatus for linearly advancing elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, and means for urging said roller unit about said axis of swinging movement to press said first roller surface against one of said disc faces and said second roller surface against the other of said disc faces, and means for varying the positions of the roller surfaces axially and radially of said surfaces relative to the discs.

9. Apparatus for linearly advancing elongated material through a zone at substantially constant speed and under substantially constant tension, comprising a pair of rotatable devices at the ends of said zone having peripheries movable with the material being advanced, a first disc operatively connected to one of said devices for controlling the rotation thereof, a second disc operatively connected to the other of said devices for controlling the rotation thereof, said discs having confronting traction faces, a roller unit including axially spaced apart first and second roller surfaces rotatable together about a vertically movable horizontal axis with said roller surfaces being disposed between said disc faces, means mounting said roller unit to permit movement of the axis of rotation of said roller surfaces both as a swinging movement and as a translational movement, means for urging said roller unit about said axis of swinging movement to press said first roller surface against one of said disc faces and said second roller surface against the other of said disc faces, means mounting the roller surfaces for movement axially thereof relative to the discs, and means for moving the roller surfaces radially thereof relative to the discs.

10. A drive unit for apparatus to linearly advance elongated material on devices having peripheries movable with the material being advanced, comprising a pair of discs spaced apart and mounted for rotation on an axis, the discs being operatively connected to the devices, rollers mounted on means permitting swinging movement thereof between the discs in positions for surface contact with the respective discs, means for moving the rollers axially thereof relative to the discs, means for moving the rollers radially thereof relative to the discs, and drive means operatively connected with the rollers for rotation thereof in operative relation to the discs.

11. A drive unit for apparatus to linearly advance elongated material, comprising a pair of discs spaced apart and mounted for rotation on an axis, rollers mounted between the discs in positions for surface contact with the respective discs, a pair of levers, means carried by the levers for supporting the rollers and for movement of the rollers bodily relative to the discs, means mounting the levers for pivotal movement about an axis transverse to the axis of rotation of the discs, and means acting on the levers controlling the pivotal movement and for yieldably holding the rollers in preset position relative to the discs.

12. A drive unit for apparatus to linearly advance elongated material, comprising a pair of discs spaced apart and mounted for rotation on an axis, rollers mounted between the discs in positions for surface contact with the respective discs, a pair of levers, means carried by the levers for supporting the rollers and for movement of the rollers bodily relative to the discs, means mounting the levers for pivotal movement about an axis transverse to the axis of rotation of the discs, means acting on the levers for yieldably holding the rollers in preset position relative to the discs, and fluid power means operatively connected with the levers for controlling the pivotal movement thereof and the movement of the rollers.

13. A structure as set forth and defined in claim 1 including, manually operated means for selectively rendering said discs ineffective relative to said devices whereby said material may be advanced between said peripheries independently of said roller unit.

14. A drive unit according to claim 10 including, clutch means for rendering said rollers and said discs ineffective relative to said devices for advancing said material.

15. A drive unit according to claim 10 including, manually operated clutch means for rendering said rollers and said discs ineffective relative to said devices for advancing said material.

16. In dyeing apparatus of the type having a dye vat, a pair of rotatable cloth roll supports, and guide means for guiding a fabric passing from one cloth roll support to the other through the dye vat, the improvement which comprises a first member operatively connected to one of said cloth roll supports for controlling the rotation thereof, a second member operatively connected to the other of said cloth roll supports for controlling the rotation thereof, said members being mounted for independent rotation about a common axis and each having a substantially planar contact face transverse to said axis, said contact faces being disposed in spaced-apart confronting relation, a roller unit including first and second roller surfaces rotatable together about a movable axis lying always in a plane transverse to said faces with said roller surfaces being disposed between said faces and on opposite sides, respectively, of a line perpendicular to said plane and intersecting the axis of rotation of said faces, the diameters of said roller surfaces being equal, and less than the distance between said faces, said roller unit being mounted to permit movement of said plane in a direction parallel to said line back and forth across the axis of rotation of said faces and to permit movement of the axis of rotation of said roller surfaces within said plane both as a swinging movement about an axis parallel to said line and as a translational movement to and fro in a direction parallel to said faces, means for urging said roller unit about said axis of swinging movement to press said first roller surface against one of said faces and said second roller surface against the other of said faces, means for applying a force to said roller unit tending to move it in a direction parallel to said line, and drive means operatively connected to said roller unit for rotating said roller surfaces.

17. In dyeing apparatus of the type having a dye vat, a pair of rotatable cloth roll supports, and guide means for guiding a fabric passing from one cloth roll support to the other through the dye vat, the improvement which comprises a first member operatively connected to one of said cloth roll supports for controlling the rotation thereof, a second member operatively connected to the other of said cloth roll supports for controlling the rotation thereof, said members being mounted for independent rotation about a common axis and each having a substantially planar contact face transverse to said axis, said contact faces being disposed in spaced-apart confronting relation, a roller unit including first and second roller surfaces rotatable together about a movable axis lying always in a plane transverse to said faces with said roller surfaces being disposed between said faces and on opposite sides, respectively, of a line perpendicular to said plane and intersecting the axis of rotation of said faces, the diameters of said roller surfaces being equal, and less than the distance between said faces, said roller unit being mounted to permit movement of said plane in a direction parallel to said line back and forth across the axis of rotation of said faces and to permit movement of the axis of rotation of said roller surfaces within said plane both as a swinging movement about an axis parallel to said line and as a translational movement to and fro in a direction parallel to said faces, pneumatic means for urging said roller unit about said axis of swinging movement to press said first roller surface against one of said faces and said second roller surface against the other of said faces and for applying a force to said roller unit tending to move it in a direction parallel to said line, drive means operatively connected to said roller unit for rotating said roller surfaces, and valve means for inactivating said pneumatic means.

18. In dyeing apparatus of the type having a dye vat, a pair of rotatable cloth roll supports, and guide means for guiding a fabric passing from one cloth roll support to the other through the dye vat, the improvement which comprises a first member operatively connected to one of said cloth roll supports for controlling the rotation thereof, a second member operatively connected to the other of said cloth roll supports for controlling the rotation thereof, said members being mounted for independent rotation about a common axis and each having a substantially planar contact face transverse to said axis, said contact faces being disposed in spaced-apart confronting relation, a roller unit including first and second roller surfaces rotatable together about a movable axis lying always in a plane transverse to said faces with said roller surfaces being disposed between said faces and on opposite sides, respectively, of a line perpendicular to said plane and intersecting the axis of rotation of said faces, the diameters of said roller surfaces being equal, and less than the distance between said faces, said roller unit being mounted to permit movement of said plane in a direction parallel to said line back and forth across the axis of rotation of said faces and to permit movement of the axis of rotation of said roller surfaces within said plane both as a swinging movement about an axis parallel to said line and as a translational movement to and fro in a direction parallel to said faces, means for urging said roller unit about said axis of swinging movement to press said first roller surface against one of said faces and said second roller surface against the other of said faces, yielding adjustable means for applying a regulatable force to said roller unit tending to move it in a direction parallel to said line, damping means for damping movements of said roller unit in a direction parallel to said line, and drive means operatively connected to said roller unit for rotating said roller surfaces.

19. In dyeing apparatus of the type having a dye vat, a pair of rotatable cloth roll supports, and guide means for guiding a fabric passing from one cloth roll support to the other through the dye vat, the improvement which comprises a first traction disc operatively connected to one of said cloth roll supports for controlling the rotation thereof, a second traction disc operatively connected to the other of said cloth roll supports for controlling the rotation thereof, said traction discs being mounted for independent rotation about a common horizontal axis and each having a substantially planar vertical contact face, said contact faces being disposed in spaced-apart confronting relation, a roller unit including first and second roller surfaces rotatable together about a horizontal axis with said roller surfaces being disposed between said faces and on opposite sides, respectively, of a vertical line intersecting the axis of rotation of said discs, the diameters of said roller surfaces being equal, and less than the distance between said disc faces, said roller unit being mounted to permit bodily movement thereof both in a horizontal and in a vertical direction back and forth across the axis of rotation of said discs and to permit swinging movement thereof about a vertical axis located between said roller surfaces, means for urging said roller unit about said axis of swinging movement to press said first roller surface against one of said disc faces and said second roller surface against the other of said disc faces, means for applying a force to said roller unit tending to move it vertically, and drive means operatively connected to said roller unit for rotating said roller surfaces.

20. In dyeing apparatus of the type having a dye vat, a pair of rotatable cloth roll supports, and guide means for guiding a fabric passing from one cloth roll support to the other through the dye vat, the improvement which comprises a first traction disc operatively connected to one of said cloth roll supports for controlling the rotation thereof, a second traction disc operatively connected to the other of said cloth roll supports for controlling the rotation thereof, said traction discs being mounted for independent rotation about a common horizontal axis and each having a substantially planar vertical contact face, said contact faces being disposed in spaced-apart confronting relation, a roller unit including a horizontal shaft section extending into the space between said faces, and first and second rollers secured in spaced-apart relation to said shaft section between said disc faces, each of said rollers having a spherical traction surface of a diameter less than the distance between said disc faces, a horizontal guide extending parallel to said shaft section and being mounted for vertical bodily movement, a carriage mounted on said guide for vertical movement therewith and for horizontal movement along said guide, means rotatably mounting said shaft section on said carriage for vertical and horizontal movements therewith and for swinging movement relative to said carriage about a vertical axis located between said rollers, means for urging said shaft section about said axis of swinging movement to press the surface of said first roller against one of said disc faces and the surface of said second roller against the other of said disc faces, means for applying a force to said guide tending to move it vertically, and drive means operatively connected to said shaft section to rotate said shaft section.

21. In dyeing apparatus of the type having a dye vat, a pair of rotatable cloth roll supports, and guide means for guiding a fabric passing from one cloth roll support to the other through the dye vat, the improvement which comprises a first traction disc operatively connected to one of said cloth roll supports for controlling the rotation thereof, a second traction disc operatively connected to the other of said cloth roll supports for controlling the rotation thereof, said traction discs being mounted for independent rotation about a common horizontal axis and each having a substantially planar vertical contact face, said contact faces being disposed in spaced-apart confronting relation, a roller unit including first and second roller surfaces rotatable together about a horizontal axis with said roller surfaces being disposed between said faces and on opposite sides, respectively, of a vertical line intersecting the axis of rotation of said discs, the diameters of said roller surfaces being equal, and less than the distance between said disc faces, said roller unit being mounted to permit bodily movement thereof both in a horizontal and in a vertical direction back and forth across the axis of rotation of said discs and to permit swinging movement thereof about a vertical axis located between said roller surfaces, stop means for limiting the vertical movements of said roller unit to a narrow range, means for damping the vertical movements of said roller unit, means for urging said roller unit about said axis of swinging movement to press said first roller surface against one of said disc faces and said second roller surface against the other of said disc faces, means for applying a force to said roller unit tending to move it vertically, and drive means operatively connected to said roller unit for rotating said roller surfaces.

22. In dyeing apparatus of the type having a dye vat, a pair of rotatable cloth roll supports, and guide means for guiding a fabric passing from one cloth roll support to the other through the dye vat, the improvement which comprises a housing, a first traction disc within said housing operatively connected to one of said cloth roll supports for controlling the rotation thereof, a second traction disc within said housing operatively connected to the other of said cloth roll supports for controlling the rotation thereof, said traction discs being mounted for independent rotation about a common horizontal axis and each having a substantially planar vertical contact face, said contact faces being disposed in spaced-apart confronting relation, a roller unit within said housing including first and second roller surfaces rotatable together about a horizontal axis with said roller surfaces being disposed between said faces and on opposite sides, respectively, of a vertical line intersecting the axis of rotation of said discs, the diameters of said roller surfaces being equal, and less than the distance between said disc faces, said roller unit being mounted to permit bodily movement thereof both in a horizontal and in a vertical direction back and forth across the axis of rotation of said discs and to permit swinging movement thereof about a vertical axis located between said roller surfaces, at least one pneumatic device mounted for bodily vertical and horizontal movement with said roller unit and being operatively connected to said roller unit for urging said roller unit about said axis of swinging movement to press said first roller surface against one of said disc faces and said second roller surface against the other of said disc faces, means operable from the exterior of said housing for actuating said pneumatic device, means for applying a force to said roller unit tending to move it vertically, and drive means operatively connected to said roller unit for rotating said roller surfaces.

23. In dyeing apparatus of the type having a dye vat, a pair of rotatable cloth roll supports, and guide means for guiding a fabric passing from one cloth roll support to the other through the dye vat, the improvement which comprises a first traction disc operatively connected to one of said cloth roll supports for controlling the rotation thereof, a second traction disc operatively connected to the other of said cloth roll supports for controlling the rotation thereof, said traction discs being mounted for independent rotation about a common horizontal axis and each having a substantially planar vertical contact face, said contact faces being disposed in spaced-apart confronting relation, a roller unit including first and second roller surfaces rotatable together about a horizontal axis with said roller surfaces being disposed between said faces and on opposite sides, respectively, of a vertical line intersecting the axis of rotation of said discs, the diameters of said roller surfaces being equal, and less than the distance between said disc faces, said roller unit being mounted to permit bodily movement thereof both in a horizontal and in a vertical direction back and forth across the axis of rotation of said discs and to permit swinging movement thereof about a vertical axis located between said roller surfaces, means for urging said roller unit about said axis of swinging movement to press said first roller surface against one of said disc faces and said second roller surface against the other of said disc faces, pneumatic means for applying a force to said roller unit tending to move it vertically, adjustable pressure regulating means operatively connected to said pneumatic means to permit adjustment of the magnitude of said force, and drive means operatively connected to said roller unit for rotating said roller surfaces.

24. Apparatus for linearly advancing elongated material through a zone at substantially constant speed and under substantially constant tension, comprising a pair of rotatable devices at the ends of said zone having peripheries movable with the material being advanced, a first disc rotatable about a horizontal axis and being operatively connected to one of said devices for controlling the rotation thereof, a second disc rotatable about a horizontal axis and being operatively connected to the other of said devices for controlling the rotation thereof, said discs being mounted for independent rotation and having confronting vertical traction faces, a roller unit including axially spaced apart first and second roller surfaces rotatable together about a vertically movable horizontal axis with said roller surfaces being disposed between said disc faces, said roller unit being mounted to permit movement of the axis of rotation of said roller surfaces within a horizontal plane both as a swinging movement about a vertical axis and as a horizontal translational movement, and means for urging said roller unit about said axis of swinging movement to press said first roller surface against one of said disc faces and said second roller surface against the other of said disc faces.

References Cited by the Examiner

UNITED STATES PATENTS

| | | | |
|---|---|---|---|
| 1,428,898 | 9/1922 | Nagle | 74—201 |
| 2,914,266 | 11/1959 | Connell | 242—55.14 |
| 2,971,714 | 2/1961 | Mitchell et al. | 242—55.12 |
| 2,983,457 | 5/1961 | Toro | 242—55.12 |
| 3,096,038 | 7/1963 | Fundingsland | 242—55.14 |

FOREIGN PATENTS

| | | |
|---|---|---|
| 435,960 | 1/1912 | France. |
| 1,104,918 | 4/1961 | Germany. |

FRANK J. COHEN, *Primary Examiner.*

W. S. BURDEN, *Assistant Examiner.*